//united States Patent Office 3,238,056
Patented Mar. 1, 1966

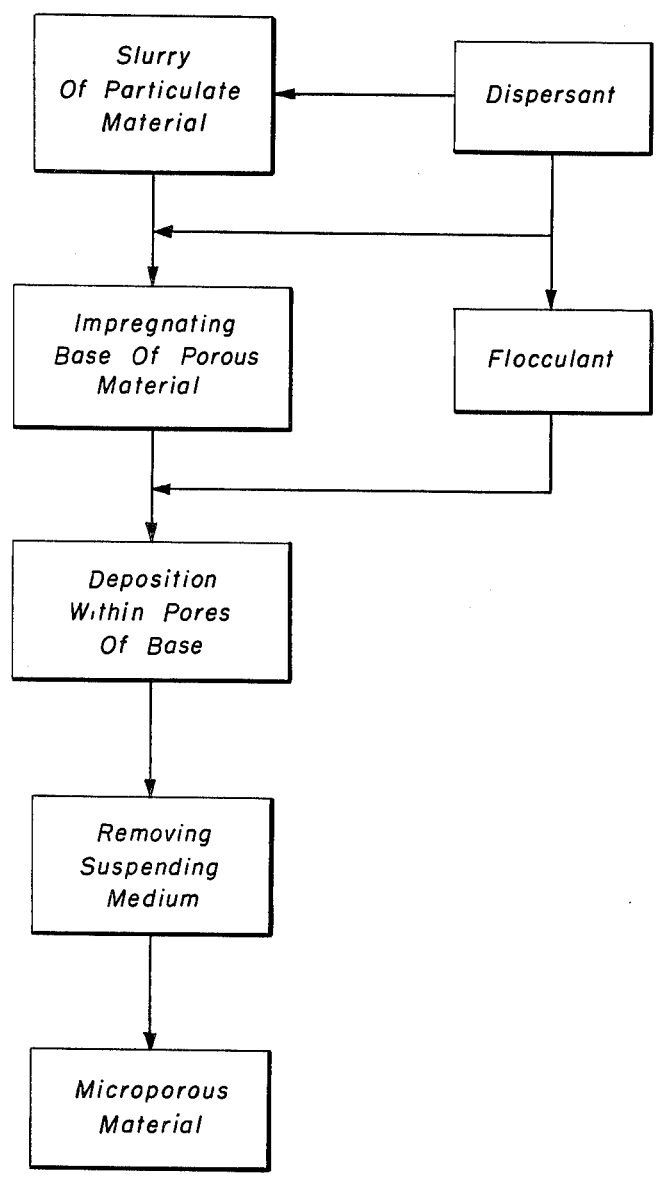

3,238,056
MICROPOROUS MATERIALS AND PROCESS
OF MAKING THE SAME
David B. Pall, Roslyn Heights, and Cyril A. Keedwell,
Levittown, N.Y., assignors to Pall Corporation, Glen
Cove, N.Y., a corporation of New York
Filed Mar. 27, 1961, Ser. No. 98,595
15 Claims. (Cl. 117—98)

This application is a continuation-in-part of Serial No. 74,130, filed December 6, 1960, now Patent No. 3,158,532.

This invention relates to microporous materials and more particularly to nonwoven fibrous materials having ultrafine or micro pores and especially adapted for use as filter media, and to a process for preparing such materials. The materials comprise a porous base impregnated with particles of the same or different sizes, and are characterized by pores extending from surface to surface whose original diameter is reduced by the said particles to 25μ or less.

One of the most difficult types of filter media to manufacture is a filter having ultrafine or micro pores, i.e., pores whose diameter is 25μ or less. Such filters must have substantially no pores whose diameter is beyond the permissible maximum, and this, in view of the small size thereof, is a difficult requirement to meet. Microporous membrane filters have been developed such as, for example, those described in U.S. Patents Nos. 1,421,341 to Zsigmondy, 1,693,890 and 1,720,670 to Duclaux, 2,783,894 to Dovell et al., 2,864,777 to Robinson, and 2,944,017 to Cotton. These filters are however quite dependent upon the physical properties of the plastic material used in their preparation, are frequently brittle and fragile, especially if pore volume is high, and are in any case expensive compared to similar porous media of comparable properties but unduly large pores, such as paper and nonwoven fibrous bats.

Paper filters of normal porosity are available and economical, but unfortunately, suitable ultrafine pore papers are not. Papers having a proportion of ultrafine pores of the order of 10μ can be manufactured, but such papers also have pores ranging up to 150μ or more, and it is apparently very difficult if not impossible to prepare at a reasonable cost papers having substantially no pores more than 25μ in diameter. This is also true of nonwoven fibrous bats.

In accordance with this invention, a process is provided for manufacturing microporous materials in the form of bats or sheets of any desired thickness having ultrafine or micro pores less than 25μ in diameter and extending from one surface of the material to the other. The process of the invention accordingly upgrades coarse filter media such as papers and nonwoven fibrous bats to the category of microporous media by reducing their pore diameter to the desired ultrafine or microporous dimensions.

In the process of the invention, particulate material, which can be in the form, for example, of fibers or granules, and which is of a size small enough to enter the pores in the porous material to be impregnated, is suspended in a fluid and deposited therefrom within the pores and, if desired, upon the surface of the porous material. Particulate material can all be of the same size, or of two or more sizes, all suspended in the fluid system. The desired reduction in pore diameter of the base is obtained by varying the size and amount of the particulate material deposited in the pores from surface to surface of the material, blending different sizes at different points, if desired. The particles can be deposited in any amount at any point in or throughout the pore, so that a porous material can be obtained in which the pores are filled in from surface to surface or only at one side or in the center of the material, as desired. Most porous materials have nonuniform pores, and advantage is taken of this nonuniformity in establishing the type, extent and location of the deposition therein that is desired.

Any porous material whose pores extend from surface to surface can be impregnated. One or several layers of the same or varying porosity can be employed. Exemplary bases are paper, porous foams of metals and of natural or synthetic plastic materials, such as aluminum, and synthetic resins and cellulose derivatives, in the form of spongy layers of any desired thickness, depending upon whether a surface-type or depth-type filter is required, such as polyurethane (see Patent No. 2,961,710), polyvinyl chloride, polyethylene and polypropylene sponges and foams, textile fabrics and nonwoven fibrous layers of all kinds, such as, felts, mats and bats, made of fibrous materials of any of the types listed below in connection with the particulate material. The characteristics of the pores thereof depend not only on the choice and amount of the materials deposited therein, but also on the base or substratum within which, and also, if desired, on which, the particulate materials are deposited.

The product of the invention is a porous material whose filtration characteristics are modified by the penetration and impregnation thereof by the particulate material to form an impregnated ultrafine or microporous filter medium. Its pore diameter is less than 25μ, and preferred embodiments have an average pore diameter from 0.05 to 2μ.

The process of the invention is applicable to particulate material of any type or size, the only requirement being that the material be capable of being suspended in a fluid, and small enough so that it can be brought within the pores of the base wherein it is to be deposited.

Fibrous material is preferred, because of its versatility, and because of the greater ease of deposition within the pores. A greater variety of diameters of fibers are available, thus making it possible to achieve a very large assortment of mixtures of different diameter fibers for making fibrous material of any porosity, and such fibers can be made of any length, so as to take advantage of the greater cohesiveness of a layer of long fibers, as compared to granular material layers. Typical fibrous materials include glass, asbestos, potassium titanate, aluminum silicate, mineral wool, regenerated cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, and metallic fibers such as iron, copper, aluminum, stainless steel, brass, monel, silver, and titanium.

Nonfibrous particular materials can also be used, but with greater difficulty. The principle of the invention requires that the particle be small enough to enter the pore in which it is deposited, and then be deposited therein. This is more difficult to do with particles than with fibers, and frequently is impossible unless a proportion of fibers is mixed in. Therefore, when particles are used, it is preferred to admix therewith at least 5% and preferably at least 25% of fibrous material.

Typical particulate materials are diatomaceous earth, Fuller's earth, silicon, magnesia, silica, talc, silica gel, alumina, quartz, carbon, activated carbon, clays, synthetic resins and cellulose derivatives, such as polyethylene, polyvinyl chloride, polystyrene, polypropylene, urea-formaldehyde, phenol-formaldehyde, polytetrafluoroethylene, polytrifluorochloroethylene, polymers of terephthalic acid and ethylene glycol, polyacrylonitrile, ethyl cellulose, polyamides, and cellulose acetate-propionate, and metal particles such as aluminum, silver, platinum, iron, copper, nickel, chromium and titanium and metal alloys of all kinds, such as Monel, brass, stainless steel, bronze, Iconel, cupronickel, Hastelloy, beryllium, and copper. The combinations of diatomaceous earth and glass fibers are preferred.

The fluid medium used for the suspension is preferably inert to the particulate material and the material to be impregnated. It should not dissolve a substantial amount thereof, although if the fluid is reused, the fact that some material is in solution is not a disadvantage, since a saturated solution is quickly formed ab initio. The fluid should be volatile at a reasonable elevated temperature below the melting point of the material to facilitate removal after the suspension is deposited. However, nonvolatile fluids may be desirable under certain conditions, and those can be removed, as is more fully described later, by washing out with a volatile solvent that is a solvent for the fluid but not for the particulate material. The fluid can be the liquid to be filtered by the impregnated material.

Typical fluids are water, polyalkylene glycols, such as polyethylene glycols, poly 1,2-propylene glycols, and mono and di alkyl ethers thereof, such as the methyl, ethyl, butyl and propyl mono and di ethers, dialkyl esters of aliphatic dicarboxylic acids, such as, di-2-ethylhexyl adipate and glutarate, mineral lubricating oils, hydraulic fluids, vegetable oils, and organic solvents such as xylene, silicone fluids, chloro, bromo and fluoro hydrocarbons, such as the Freons, and petroleum ethers. Since the impregnated material is potentially useful to filter any liquid, depending upon the choice of particulate material, obviously a wide selection of fluids is available, and such would be known to one skilled in this art.

As has been stated, it is essential that the particulate material be held within the pores of the porous material, after impregnation, and not pass right through. Obviously, any material small enough to enter a pore in theory can pass through and emerge on the other side. As a practical matter, this does not happen if the impregnation is conducted as taught herein. There are several ways of obtaining the desired amount and location of the impregnation. One factor is the size of the particulate material. This can be so chosen as to be only slightly smaller than the pore diameter of the base. Very few pores are straight through, and such a size particle will encounter an obstruction and lodge against the wall of the pore, which of course constitutes the fibers of which the base is made, blocking passage to any remaining particles. Fibrous particles of a given size are more easily lodged in the pores than granular material, possibly due to entanglement with other fibers therein. Hence, it is frequently advantageous to use a blend of small and large particles to assist in establishing a blockage in the pores, and obtain a diminution of pore diameter of the desired magnitude.

As a further safeguard, the surface of the porous material opposite that at which the impregnation is being effected can be partially coated with a plastic material to reduce the pore diameters at that surface. Alternatively, the porous material can be backed by a layer having finer pores, which layer can be arranged to form a part of the final product, for example, by bonding thereto to form a laminate, or which can be merely in contact therewith, and removed after deposition or blockage of the pores has been effected. Some porous materials such as paper have tapered pores, due to a greater density on one side than on the other, rising during laydown of the paper fibers. In this event, impregnation can be from the less dense side, using material too small to pass through the pore on the denser side.

The amount and location of impregnation can be controlled by control of deposition through a varying of the size of particulate material introduced, or with the aid of dispersing or flocculating agents, or by the amount of agitation applied to the slurry during deposition.

If material of larger size is added to the impregnating slurry, more blockage of the pores up to total exclusion of impregnant is obtained. Starting with a dispersion capable of impregnation, penetration, i.e., impregnation is reduced as the size of the impregnant increases.

In order to aid the formation of a more stable slurry, and also in deposition of particles at any desired location within the pores, a dispersing agent can be used, although it is not essential. Any dispersing agent known to disperse the particulate material used can be employed. The dispersing agent should also wet the base to be impregnated. These can be of the type used in the paper-making trade, such as the alkali metal polyphosphates, for example, sodium hexametaphosphate, sodium pyrophosphate, sodium metasilicate, pentasodium tripolyphosphate, and sodium metaphosphate, as well as any synthetic surfactant or organic emulsifier, such as are described in Schwartz and Perry, "Surface Active Agents."

If a dispersant is used, withdrawal thereof will lead to deposition. Thus, a stream of slurry and of dispersant can be blended just before impregnation, and the proportion of dispersant gradually reduced or stopped to provoke deposition. Alternatively, a precipitating agent can be added to the impregnant, or the porous material impregnated therewith prior to the slurry. Also, a dispersant can be impregnated before the slurry, dispersing the first portion of the slurry and ensuring that it will be carried deeper into the pore.

Deposition can be effected by a flocculating agent. These can be of the type used in the paper-making trade. Exemplary are paper maker's alum, aluminum sulfate (used in the presence of a polyphosphate), and sodium carbonate (used in the absence of a polyphosphate). The flocculating agent can be added to the slurry after the desired amount of material has been impregnated, to effect deposition. It also can be impregnated before the slurry, to ensure deposition as soon as it blends with the slurry. In a case of this type, it is preferred that the slurry be on the verge of instability and deposition, so that flocculation, i.e., deposition, promptly follows blending with even small amounts of flocculating agent.

Some particulate materials tend to flocculate others, due to, for example, a difference in charge on the particles. Potassium titanate fibers are flocculants for asbestos fibers. Addition of the former to the latter therefore results in flocculation.

An unstable slurry can be kept relatively uniform by agitation. As soon as agitation ceases, as within the pores, the instability of the slurry results in deposition. Thus, such a slurry can be impregnated through a moving apertured plate held closely to the porous material, so that turbulence produces a fine dispersion that settles out within the pores where agitation is less or nonexistent.

It is apparent that careful adjustment of these parameters makes it possible to obtain any amount and location of impregnation in the porous material, from complete to partial impregnation. Whether the former or the latter is desired will depend upon the need.

To obtain the highest flow rate of permeability, the amount and depth of impregnant should be as little as possible. A depth as small as two to three fiber diameters will give the desired pore diameter of $25\mu$ or less, and reduce flow rate, while obtaining good adhesion to the base. However, better adhesion of the impregnant to the base is obtained with greater depths of impregnant. Flow rate varies directly with the ratio of void volume to fiber volume, i.e., the percentage of voids in the impregnated material.

Complete impregnation is best obtained using a slurry in which the partic as possible so as to be able to penetrate the full depth of the substrate. Short fibers and small particles are needed. The reverse effect, partial impregnation, is obtained with long fibers and large particles. Short and small fibers are kept from passing completely through the pores by blending with longer and larger fibers in a small amount, usually at least 5%.

The finer the particulate material, the smaller the final pore diameter and the lower the permeability of the impregnated material.

The amount of dispersing agent and flocculating agent should be selected with care, since if too much dispersant is used, the particulate material will pass right through the porous material, whereas if too much of the flocculating agent is used, the slurry is unstable, and the particulate material will not impregnate the pores. However, the relative amounts are readily determined by trial and error in each case, in relation to the particles, their size, the temperature of deposition, the hardness of the water, and the solids content of the dispersion. Usually, from 0.001 to 5% of dispersant and from 0.001 to 5% of flocculant are satisfactory. These can be used separately as described (or together in the slurry in amounts to give dispersion until impregnation, with deposition in the pores.

In order to aid in penetration of the porous material by impregnating slurry, a wetting agent which wets the material can be incorporated. If a dispersing agent is used, this should also serve as a wetting agent for the base, and therefore should not only disperse the particulate material but should also wet the base material. If no dispersing agent is used, a wetting agent may be desirable. Potassium titanate, for example, does not require a dispersing agent to form a sufficiently stable slurry in water, but a wetting agent may be required to obtain impregnation of certain bases, such as paper, glass, wool and synthetic resins.

From 0.001 to 5% of a wetting agent is usually sufficient. Anionic, nonionic and cationic wetting agents can be used; preferably, the wetting agent should not have an affinity for the base, so that it can be rinsed off easily with the slurry fluid or some other solvent after impregnation.

The compression and hence bulk density of the impregnation can be varied by varying the differential pressure across the layer during deposition. The differential pressure is in turn dependent upon fluid velocity and viscosity, and the permeability of the porous material. For a given differential pressure, impregnation density can be decreased by including a small amount of bulked or crimped coarse particles which can support the finer particles, and space them better.

When the particulate materials are deposited in the form of an impregnation within a porous layer, tortuous passages of varying sizes exist between the particles. These passages in the aggregate have a mean pore size which determines the effective diminished diameter of the pore, and which depends on:

(1) The mean diameter of the particles.
(2) The shape of the particles.
(3) The length of the particles (particularly fibers).
(4) The distance between adjacent particles.

Unless an arbitrary external force is applied during deposition, the last depends upon the first three, so that these can be said generally to control mean pore size under any given deposition conditions.

Fine and coarse particles, such as fibers, may be combined and blended to produce an impregnation having an intermediate mean pore diameter dependent on the proportions of the particles. Different sizes of particles can be deposited in different regions of the pore, and the strata or layers thus produced interlocked by blending the two sizes at a zone including their interface. In this way, a top layer of fibers of a different size from that used in the impregnation can be used to lock the top layer to the impregnated layer.

The figure is a flow chart showing the various steps of the process of the invention.

A slurry or suspension of particulate material is placed in a reservoir. If a blend of particulate material is desired, two such slurries can be blended together, in varying proportions, according to the desire, or a blend of material is suspended in a single slurry. The slurry of a particulate material is then fed to the base within which the material is to be deposited. Dispersant and/or flocculant also can be added at this point. It is then impregnated therein, and the particulate material deposited in the pores. The impregnated base is then dried, and if a binder is employed treated to develop the bond anchoring the impregnation to the base.

There can be incorporated in the fluid medium in which the particulate material is suspended a bonding agent or binder for anchoring the particulate material in the pores of the impregnated material. This is especially desirable when fine impregnants are used, in small amounts. Beater addition binders used in the paper industry can be employed. Alternatively, the bonding agent or binder may be flowed through the impregnated base as a final operation or it may be added to the suspension in the form of thermoplastic material, particles or fibers, such as the fibrids and fibers of polyvinyl chloride, nylon, polyacrylonitrile, esters of terephthalic acid and ethylene glycol, cellulose acetate, and polyethylene. The binder can also be incorporated in the impregnated base after deposition, if it has a deleterious effect upon the slurry. It can for example be washed through the layer after the fluid has been drawn off, or it can be deposited on the surface of the layer, where it will also serve as an anchoring layer for a surface coating.

Any type of adhesive or binder can be employed; it must, of course, be dispersible in the fluid. Many useful binders are known in nonwoven fabric art. Thermosetting binders requiring heating or ageing to effect a cure can be incorporated, and in this case provision is made for curing the binder in situ after deposition.

Typical thermoplastic binders include polyethylene, polypropylene, polymethylene, polyisobutylene, nylon, cellulose acetate, ethyl cellulose, copolymers of vinyl chloride and vinyl acetate, polyvinyl chloride, polyvinylidene chloride, polyvinyl butyral, polyacrylic resins, such as polymethyl methacrylate, alkyd resins, and synthetic rubbers such as butadiene-styrene polymers. Thermosetting binders that can be used include phenol-formaldehyde resins, urea-formaldehyde resins, melamine-formaldehyde resins, polyester resins, and epoxy resins, such as polymers of ethylene chlorohydrin and bisphenol "A." Binders which are used in solution form to apply them to the layer include any of the above and also polytetrafluoroethylene, polytrifluorochloroethylene, lignin-sulfonate resins, starch binders, casein binders, and terpene resins.

It is also possible to bond the impregnated particulate material together and to the porous base, if the particulate material is thermoplastic or is rendered adhesively tacky by the action of organic solvents, by application of heat or solvent, with some pressure at the time the particulate material is tacky. The particles will then be brought together and adhered to each other, so that when the material has cooled or the solvent removed they will be bonded to each other. Such techniques are well known in the non-woven fibrous bat art, and need not be further elaborated upon here.

After the impregnation has been completed, it may be desirable to remove from the impregnated base substantially all or a part of the fluid medium of the slurry. This is indicated, for example, if the base is to be impregnated with a binder. Usually, if the fluid is sufficiently volatile, it can be removed by drawing warm or hot air through the base by application of a differential pressure across the base, in the same manner as that by which the base is impregnated. A nonvolatile liquid can be removed by washing it out with a volatile solvent and then removing the solvent in this way.

If it is necessary to cure any bonding agent for the particles thereof, a curing oven can be provided, through which the base is passed after the deposition. The impregnated base is then also dried in this oven.

The following examples in the opinion of the inventors represent the best embodiments of their invention. In the examples, the pore size of the porous materials was evaluated by the following test:

A disc of the material to be tested was wetted with distilled water and clamped between rubber gaskets so that its downstream surface was supported by a wire screen. A test piece diameter of 0.6 inch was arbitrarily chosen so that the area under observation was approximately 1/400 square foot. The volume above the disc was filled with distilled water. Air pressure was increased in the chamber below the disc until a stream of air bubbles was observed emerging from the test piece. The pressure at this point was noted as the first bubble point. In order to obtain a measure of the pore size distribution of the test piece the pressure was increased until 10 streams of bubbles were seen. The higher pressure represented the size of the 10th pore smaller than the first. The effective pore diameter was then calculated by the well known formula $$\text{pore diameter (microns)} = \frac{238}{\text{pressure (inches of water)}}$$

The formula was double-checked against porous membranes of known pore size and proved correct within a reasonable tolerance of accuracy.

EXAMPLES 1 to 3

An asbestos blend containing 20% long fiber washed filter grade as obtained from Johns-Manville PLASTI-BEST #20 or Asbestos Corporation of America ACOA–3A and 80% short fiber having a Quebec test value of 0–0–0–16. (JM 7TG.) was dispersed in a Waring Blendor at a consistency of 1500 mg./l. for 10 minutes. 300 mg. of sodium hexametaphosphate were added to prevent flocculation of the slurry. The substrate was an all cotton paper having a ream weight of 70 pounds (20 inches×20 inches) and 0.033 caliper. The paper was impregnated with slurry to a weight of 6 grams of asbestos per square foot. The sheet was then checked for permeability with distilled water and the pore size determined as described above.

The microporous filter characteristics and the data taken are summarized in the table below. Pore diameters are given in microns for the first and tenth bubble points and permeability is given in gallons per minute of water through one square foot of the media at a differential pressure of 10 pounds per square inch.

Table I

| Example No. | Percent Asbestos | | (NaPO$_3$)$_4$, mg./liter | Weight Impregnant, g./sq. ft. | Mixing Time, Minutes | Permeability g.p.m./sq. ft., 10 p.s.i. | 1st Pore Diam., Microns | 10th Pore Diam., Microns |
|---|---|---|---|---|---|---|---|---|
| | Short | Long | | | | | | |
| 1 | 80 | 20 | 300 | 6 | 10 | 1.45 | 0.34 | 0.26 |
| 2 | 80 | 20 | 300 | 9 | 5 | 1.65 | 0.26 | 0.22 |
| 3 | 80 | 20 | 300 | 12 | 10 | 0.45 | 0.21 | 0.18 |

The amount of impregnation was determined by two methods:

(a) By microscopic examination of cross sections of the impregnated substrate.

(b) By bubble pointing the material in the *reverse* direction and measuring the pressure required to reach the first bubble or break at which point the impregnant is forced out. This *reverse* bubble pointing was performed without a supporting screen (as it was required that the impregnant should be removed from the substrate by the measured air pressure).

It was found that for the examples given the greater the weight of impregnant, the smaller the pores. The paper pores were practically filled by the impregnants, which extended through to within one or two fiber diameters to the screen side of the paper.

EXAMPLES 4 to 10

Examples 1 to 3 were repeated varying the proportions of long and short asbestos fibers, and in addition including in some runs fibrous glass and diatomaceous earth with the asbestos fibers.

The fiber blends used and the characteristics of the microporous filters obtained are summarized in Table II:

Table II

| Example No. | Percent Asbestos | | Percent Fibrous Glass, Mean Diameter | | Percent Diatomaceous Earth [1] | (NaPO$_3$)$_4$, mg./liter | Weight Impregnant gr./sq. ft. | Mixing Time, Minutes | Permeability g.p.m./sq. ft., 10 p.s.i. | 1st Pore Diam., Microns | 10th Pore Diam., Microns |
|---|---|---|---|---|---|---|---|---|---|---|---|
| | Short | Long | 0.35 | 0.62 | | | | | | | |
| 4 | 94 | 6 | 0 | 0 | 0 | 400 | 9 | 5 | 0.8 | 0.38 | 0.31 |
| 5 | 94 | 6 | 0 | 0 | 0 | 600 | 9 | 5 | 0.85 | 0.33 | 0.25 |
| 6 | 94 | 6 | 0 | 0 | 0 | 600 | 9 | 10 | 0.71 | 0.31 | 0.24 |
| 7 | 76 | 6 | 0 | 0 | 18 | 600 | 9 | 5 | 0.76 | 0.43 | 0.34 |
| 8 | 76 | 0 | 6 | 0 | 18 | 600 | 9 | 5 | 1.05 | 0.56 | 0.40 |
| 9 | 85 | 9 | 0 | 6 | 0 | 600 | 9 | 10 | 1.5 | 0.40 | 0.31 |
| 10 | 72 | 10 | 0 | 0 | 18 | 600 | 9 | 10 | 0.81 | 0.29 | 0.24 |

[1] Dicalite 115.

The diatomaceous earth increased permeability and pore diameter. The fibrous glass considerably increased permeability at a given pore diameter. In all cases, impregnation of the pores was substantially complete. With regard to reverse bubble point, at least 1 p.s.i. was required to produce a rupture in the holding of the impregnant within the pores (unsupported material in the direction reversed to the impregnated flow). In all cases the disturbance was localized to a spot approximately 1/16" in diameter, while the remainder of the test piece was undamaged. This represented a well bonded impregnation since the fibers were naturally dispersible in the water used for bubble-pointing. Subsequently the addition of a beater addition type resin such as melamine-, urea-, or phenol-formaldehyde, or an emulsion of polyvinyl acetate or acrylic resin to the fiber slurry resulted in reverse bubble point values of 3–4 p.s.i. and reductions in permeability ranging from 10 to 40%. Higher pressures caused rupture of the paper which in these particular tests was of comparatively low wet strength.

EXAMPLES 11 AND 12

Examples 1 to 3 were repeated, using 100% potassium titanate fibers and a mixture of 6% potassium titanate fiber and 94% of the short asbestos fiber of Examples 1 to 3.

The following data were taken:

Table III

| Example No. | | $(NaPO_3)_4$, mg./liter | Weight Impregnant, gr./sq. ft. | Mixing Time, Minutes | Permeability, g.p.m./sq. ft., 10 p.s.i. | 1st Pore Diam., Microns | 10th Pore Diam., Microns |
|---|---|---|---|---|---|---|---|
| 11 | 100% Potassium titanate | 600 | 9 | 10 | 38 | 1.0 | 0.89 |
| 12 | 94% short asbestos / 6% potassium titanate | 600 | 9 | 5 | 1.3 | 0.45 | 0.37 |

The potassium titanate gave a microporous filter of very high permeability for the pore diameter. Addition of potassium titanate increased impregnation, as evidenced by permeability and pore diameter. In each case, impregnation was complete. With regard to reverse bubble point, at least 1 p.s.i. was required to produce a rupture in the holding of the impregnant within the pores (unsupported material in the direction reversed to the impregnated flow). In all cases the disturbance was localized to a spot approximately 1/16" in diameter, while the remainder of the test piece was undamaged. This represented a well bonded impregnation since the fibers were naturally dispersible in the water used for bubble-pointing. Subsequently the addition of a beater addition type resin such as melamine-, urea-, or phenol-formaldehyde, or an emulsion of polyvinyl acetate or acrylic resin to the fiber slurry resulted in reverse bubble point values of 3–4 p.s.i. and reductions in permeability ranging from 10 to 40%. Higher pressures caused rupture of the paper which in these particular tests was of comparatively low wet strength.

EXAMPLE 13

Two positive displacement pumps driven through variable speed gears were used to feed slurries to the sample of media to be impregnated. The consistency of the slurries was 0.01% of dry fiber weight. The output of each pump was such that with one pump running at maximum speed the flow rate through the media was 10 g.p.m. per square foot. The media used was a cotton paper substrate having a basis weight of 54 pounds per 500 sheet ream, size 20 inches×20 inches, 0.027 caliper. Impregnation was accomplished from the felt (i.e., more open) side of the paper. Pump A containing a fine dispersion of the short asbestos fibers of Examples 1 to 3 was made to pump a total of one liter through the media over the time period for total impregnation.

For the initial 5 seconds full flow rate was maintained, after which the speed of the pump was reduced linearly to zero at 40 seconds. At the 5 seconds mark, pump B which contained a fiber slurry of the long asbestos fibers of Examples 1 to 3, was started and the speed linearly increased to full speed at 40 seconds. Flow was stopped when pump B had completed pumping 1 liter of slurry.

Total weight of fibers used was 4 grams per square foot of paper.

Permeability, 6.4 g.p.m. per sq. ft. at 10 p.s.i differential pressure:

|  | Micron |
|---|---|
| 1st pore size | 0.26 |
| 10th pore size | 0.27 |

EXAMPLE 14

Two pumps were used similar to Example 13, with the exception that pump A contained a fiber slurry of long asbestos at 0.01% of fibers on the weight of water used, and 300 mg./liter of sodium hexametaphosphate. This produced a dispersion which was stable with very little tendency to flocculate.

Pump B contained a 0.5% solution of aluminum sulfate which was capable of flocculating the slurry in A.

These were applied to the same type of paper as in Example 13. Pump A was run continuously at full speed until one liter has been pumped. Pump B was started at very low speed at 5 seconds elapsed time and increased to maximum at the 20 second mark. Both pumps were stopped when pump A had fed 1 liter total slurry to the system.

The weight of fibers used was determined by adjusting the consistency of the slurry in pump A.

Total weight of fiber _____ 3 grams/sq. ft. of paper.
Permeability _____ 1.65 g.p.m./sq. ft./10 p.s.i.
1st pore _____ 0.38 micron.
10th pore _____ 0.26 micron.

EXAMPLE 15

The substrate used in this run was cotton fiber paper having a basis weight of 35 pounds per 500 sheet ream, size 20 inches×20 inches, 0.018 caliper. Pump A contained a slurry of 135 mg./l. of long fiber asbestos of Examples 1 to 3 which had been filtered through 50 mesh screen to remove unbeaten fiber bundles and foreign particles. The solution was mildly flocculating.

Pump B contained a slurry of 15 mg./l. of potassium titanate fibers which was capable of creating strong flocculation in slurry in pump A.

Pumping proceeded as in Example 14. The dispersed phase in pump A was introduced initially then flocculated in increasing amount by adding slurry B at a slowly increasing rate of flow.

Total fiber used _____ 3 gram per sq. ft. of paper.
Permeability _____ 6.6 g.p.m. per sq. ft. at 10 p.s.i. differential pressure.
1st pore size _____ 0.32 micron.
10th pore size _____ 0.17 micron.

EXAMPLE 16

Example 15 was repeated, with the exception that a 0.5% of sodium carbonate was added to the slurry in pump B.

Total fiber used _____ 3 grams per sq. ft. of paper.
Permeability _____ 9.9 g.p.m. per sq. ft. at 10 p.s.i. differential pressure.
1st pore _____ 0.23 micron.
10th pore _____ 0.18 micron.

EXAMPLE 17

A normally flocculating system was used in slurry A which contained 150 mg. per liter of slurry consisting of 90% filtered long fiber asbestos as in Example 15 and 10% of potassium titanate.

Pump B contained a slurry of 0.1% dispersing agent such as a sodium salt of carboxylated polyelectrolyte.

Initially both pumps were run at full speed for 5 seconds. The speed of pump B was then linearly reduced until at 30 seconds it reached zero speed. Pump A was stopped when it had pumped 1 liter of slurry.

Total fiber used ___ 3 grams per sq. ft. of paper.
Permeability _____ 5.5 g.p.m. per sq. ft. at 10 p.s.i. differential pressure.
1st pore size _____ 0.35 micron.
10th pore size ____ 0.2 micron.

EXAMPLE 18

Example 17 was repeated, with the exception that the substrate was reversed, so that impregnation took place from the screen side.

Permeability _____ 6 g.p.m./sq.ft./10 p.s.i.
1st pore size _____ 0.23 micron.
10th pore size _____ 0.15 micron.

EXAMPLE 19

Example 17 was repeated, with the exception that the substrate was reversed, and in addition 0.5% of sodium carbonate was added to the slurry in pump A.

Permeability _____ 5.6 g.p.m./sq. ft./10 p.s.i.
1st pore size _____ 0.42 micron.
10th pore size _____ 0.18 micron.

EXAMPLE 20

One pump only was used to deliver fiber slurry to the substrate of Example 15. The fiber content was 150 mg. per liter of which 90% was long fiber asbestos which had been filtered to remove excessively long fibers and contaminants, as in Example 15, and 10% was potassium titanate. The slurry was normally flocculating.

The substrate was soaked in a 5% solution of organic water soluble dispersing agent before the commencement of impregnation.

Total fiber used _____ 3 grams per sq. ft. of paper.
Permeability _____ 5.2 g.p.m. per sq. ft./10 p.s.i.
1st pore _____ 0.28 micron.
10th pore _____ 0.14 micron.

EXAMPLE 21

The substrate used was a cotton fiber paper having a basis weight of 35 pounds per 500 sheet ream, size 20 inches×20 inches. Impregnation flow was from the reverse or screen side of the paper, to the felt side of the paper.

One pump only was used, containing a fiber slurry of 200 mg. fiber solids per liter, 85% long asbestos as in Examples 1 to 3, 15% potassium titanate, 0.05% by weight of sodium carbonate and 0.04% of water soluble organic dispersing agent. Turbulence was created by forcing the slurry through 24 holes .090" diameter arranged in an annulus around the test disc. In production a simple perforated plate having approximately 10% open area and rotating or reciprocating to provide turbulence above the upstream surface of the substrate would reproduce the effect of this test.

Total fiber used _____ 4 gram per sq. ft. of paper.
Permeability _____ 3.8 g.p.m./sq. ft./10 p.s.i.
1st pore size _____ 0.34 micron.
10th pore size _____ 0.19 micron.

The porous layers of the invention are useful as filters for separating solid particles from liquids and gases, as coalescers for separating suspended droplets in fluid media, as agglomerators for separating fluids entrained in gases, such as aerosols, as gas diffusers, as dialyzing membranes, and as porous separators in all types of apparatus employing fluids for any purpose, such as separators in batteries and diaphragm cells. They can be made to have a wide range of porosities below $25\mu$ to meet any need. For the ultrafine filter media, the pores can, for example, be made small enough to remove bacteria and like minute organisms. They can therefore be used as cold sterilizers to make drinking water, pure milk, and bacteria-free serums and pharmaceuticals. They can be used as shock absorbers, molded cushioning, acoustical absorbers, and in heat and sound insulation.

The porous layers of the invention have not only a higher flow rate for their pore size but also can be stronger than the available microporous membranes and ceramic filters. Available microporous filter membranes, for example, offer the following flow rates for the maximum pore sizes listed, determined by the bubble point method described above:

| Maximum pore size, microns determined by water bubble point: | Flow rates g.p.m. water per sq. ft. at $\Delta P=10$ p.s.i. |
|---|---|
| 0.3 | 0.42 |
| 0.38 | 6.8 |
| 0.65 | 30 |
| 0.7 | 48 |
| 0.92 | 160 |
| 1.1 | 320 |

Ceramic filter media offers the following range of flow rates and pore sizes:

| Maximum pore size, microns determined by water bubble point: | Flow rates g.p.m. water per sq. ft. at $\Delta P=10$ p.s.i. |
|---|---|
| 3 | 0.83 |
| 6 | 3.7 |
| 8.8 | 8.3 |
| 40 | 45 |
| 95 | 133 |

A flow rate of 1.5 to 5 g.p.m./sq. ft. at $\Delta P=10$ p.s.i. is the practical minimum for industrial use. It is apparent that neither of these media is satisfactory in flow rate in the range below $0.3\mu$ for the microporous membranes and below $7\mu$ for the ceramic filter. In contrast, the filters of the invention retain a 1.5 g.p.m./sq. ft. flow rate under the same conditions down to pore diameters of $0.15\mu$. Moreover, a nearly infinite number of flow rates for a given pore diameter is obtainable by varying base, impregnant, and impregnating condition.

We claim:

1. A process for preparing microporous material having ultrafine pores which comprises forming a suspension comprising particulate material sufficiently small to enter pores in a substrate greater than 25 microns up to about 150 microns in diameter composed of at least 5% fibrous material suspended in a fluid, bringing the suspension into contact with a substrate having a proportion of pores greater than 25 microns up to about 150 microns in diameter, flowing the suspension into and through the substrate, depositing the particulate material therewith in an amount to reduce the pore diameter to less than 25 microns, and discontinuing the flow of the suspension through the substrate while the substrate remains microporous.

2. A process in accordance with claim 1 which comprises destabilizing the suspension by adding a flocculating agent thereto.

3. A process in accordance with claim 1 which comprises forming a stable suspension by adding a dispersing agent thereto, and then destabilizing the suspension by withdrawing the dispersing agent.

4. A process in accordance with claim 1 which comprises in addition flowing a binding agent into the pores of the said material.

5. A process in accordance with claim 4 wherein the binding agent is incorporated in the suspension.

6. A process in accordance with claim 1 which comprises controlling the compression and bulk density of the particulate material impregnant by applying a differential fluid pressure across the material during deposition.

7. A process in accordance with claim 1 wherein the porous material is paper.

8. A process in accordance with claim 7 wherein the paper has a proportion of pores within the range from 10 microns up to 150 microns, and the particulate material is sufficiently less than 150 microns in diameter to permit its entry into such pores.

9. A porous material having ultrafine pores substantially all of which are less than $25\mu$ in diameter, comprising a porous material having relatively large pores within which is deposited particulate material comprising at least 5% fibrous material in an amount to diminish the diameter thereof to less than 25μ over at least a portion of their length between the surfaces of the material, prepared in accordance with the process of claim 1.

10. A process in accordance with claim 1 in which the particulate material is deposited within the pores from surface to surface of the material.

11. A process in accordance with claim 1 in which the particulate material comprises asbestos fibers.

12. A process in accordance with claim 1 in which the fibrous material comprises glass fibers.

13. A process in accordance with claim 1 in which the particulate material comprises a blend of fibrous material and granular material.

14. A process in accordance with claim 13 in which the fibrous material is glass fibers and the granular material diatomaceous earth.

15. A porous material having ultrafine pores whose average diameter is within the range from 0.05 to 2μ comprising a porous material having relatively large pores within which is deposited particulate material comprising at least 5% fibrous material in an amount to diminish the diameter thereof to within the range from 0.05 to 2μ over at least a portion of their length between the surfaces of the material.

References Cited by the Examiner

UNITED STATES PATENTS

| | | | |
|---|---|---|---|
| 1,396,834 | 11/1921 | Hall | 117—98 |
| 1,857,498 | 5/1932 | Clapp | 117—152 |
| 2,372,437 | 3/1945 | Lathrop et al. | 210—505 X |
| 2,517,753 | 8/1950 | Ximenez et al. | 210—505 X |
| 2,746,608 | 5/1956 | Briggs | 210—504 |
| 2,971,907 | 2/1961 | Smith | 210—504 |
| 3,039,914 | 6/1962 | Reiman | 162—149 XR |
| 3,053,762 | 9/1962 | Adiletta | 210—507 |

WILLIAM D. MARTIN, *Primary Examiner.*

RICHARD D. NEVIUS, *Examiner.*